(12) United States Patent
Fujimoto et al.

(10) Patent No.: US 7,984,539 B2
(45) Date of Patent: Jul. 26, 2011

(54) CHAMBER REPLACING METHOD

(75) Inventors: Junichi Fujimoto, Fujisawa (JP); Hakaru Mizoguchi, Hiratsuka (JP); Tatsuo Enami, Yokohama (JP)

(73) Assignees: Gigaphoton Inc., Tochigi (JP); Komatsu Ltd., Tokyo (JP); Ushio Denki Kabushiki Kaisha, Tokyo (JP)

( * ) Notice: Subject to any disclaimer, the term of this patent is extended or adjusted under 35 U.S.C. 154(b) by 891 days.

(21) Appl. No.: 11/984,292

(22) Filed: Nov. 15, 2007

(65) Prior Publication Data
US 2008/0115342 A1    May 22, 2008

(30) Foreign Application Priority Data

Nov. 16, 2006   (JP) ................................. 2006-310317

(51) Int. Cl.
*B29C 73/00* (2006.01)
(52) U.S. Cl. .................................................. 29/402.01
(58) Field of Classification Search .......... 29/428, 29/402.01, 402.03, 402.08; 372/55, 57, 59, 372/60, 31, 32, 33, 94, 19; 250/492.1
See application file for complete search history.

(56) References Cited

U.S. PATENT DOCUMENTS

| | | | | |
|---|---|---|---|---|
| 7,746,913 B2 * | 6/2010 | Ershov et al. | ................... | 372/57 |
| 7,778,302 B2 * | 8/2010 | Ershov et al. | ................... | 372/57 |
| 2007/0297483 A1 * | 12/2007 | Wakabayashi et al. | .......... | 372/97 |

* cited by examiner

*Primary Examiner* — John C Hong
(74) *Attorney, Agent, or Firm* — Wenderoth, Lind & Ponack, L.L.P.

(57) ABSTRACT

When a chamber of an oscillator and one or more amplifiers is to be replaced at the timing when a predetermined period elapses, one of the chambers of the oscillator and the amplifiers having a low allowable deterioration limit is detached and this chamber is attached in place of one of the chambers of the oscillator and the amplifiers other than the one having the low allowable deterioration limit. Thus, the chamber which has been used in one of the oscillator and amplifiers having a low allowable deterioration limit and has not reached the limit of deterioration is reused in one of the oscillator and the amplifiers other than the one having the low allowable deterioration limit. This enables efficient use of oscillator and amplifier chambers in a multistage amplification laser apparatus, minimizing the labor and parts consumed for replacement thereof.

14 Claims, 4 Drawing Sheets

CHAMBER REPLACING METHOD

BACKGROUND OF THE INVENTION

1. Field of the Invention

The present invention relates to a chamber replacing method for use in a multistage amplification laser apparatus having an oscillator and at least one amplifier, chambers of which are common in configuration but have different tolerance limits of deterioration from each other. The present invention particularly relates to a chamber replacing method which is designed such that one of the chambers attached to the oscillator and the one or more amplifiers having a relatively low allowable deterioration limit is detached and reattached to be reused in place of another one of the chambers attached to the oscillator and the one or more amplifiers other than the one having the low allowable deterioration limit.

2. Description of the Related Art

As semiconductor integrated circuits are improved by refining their configuration and increasing the degree of integration, semiconductor exposure devices (hereafter, referred to as "exposure devices") are required to have improved resolution. For this purpose, studies have been conducted to reduce the wavelength of light emitted by an exposure light source. A gas laser apparatus is used as the exposure light source in place of a conventional mercury lamp. Nowadays, KrF excimer lasers emitting ultraviolet rays having a wavelength of 248 nm and ArF excimer lasers emitting ultraviolet rays having a wavelength of 193 nm are used as exposure gas laser apparatuses.

Studies have been conducted on a next-generation exposure technology referred to as immersion exposure technology in which space between a wafer and an exposure lens of an exposure device has liquid to change the index of refraction, whereby the apparent wavelength of the exposure light source is reduced. When immersion exposure is performed by using an ArF excimer laser as the exposure light source, a wafer is irradiated with ultraviolet light having a wavelength if 134 nm in water. This technology is referred to as ArF immersion exposure technology (or ArF immersion lithography).

One of next-next-generation exposure light sources is an EUV light source. Immersion technology may be performed by using an F2 laser as the exposure light source. In this case, the wafer is irradiated with ultraviolet light having a wavelength of 115 nm.

Figure 1:
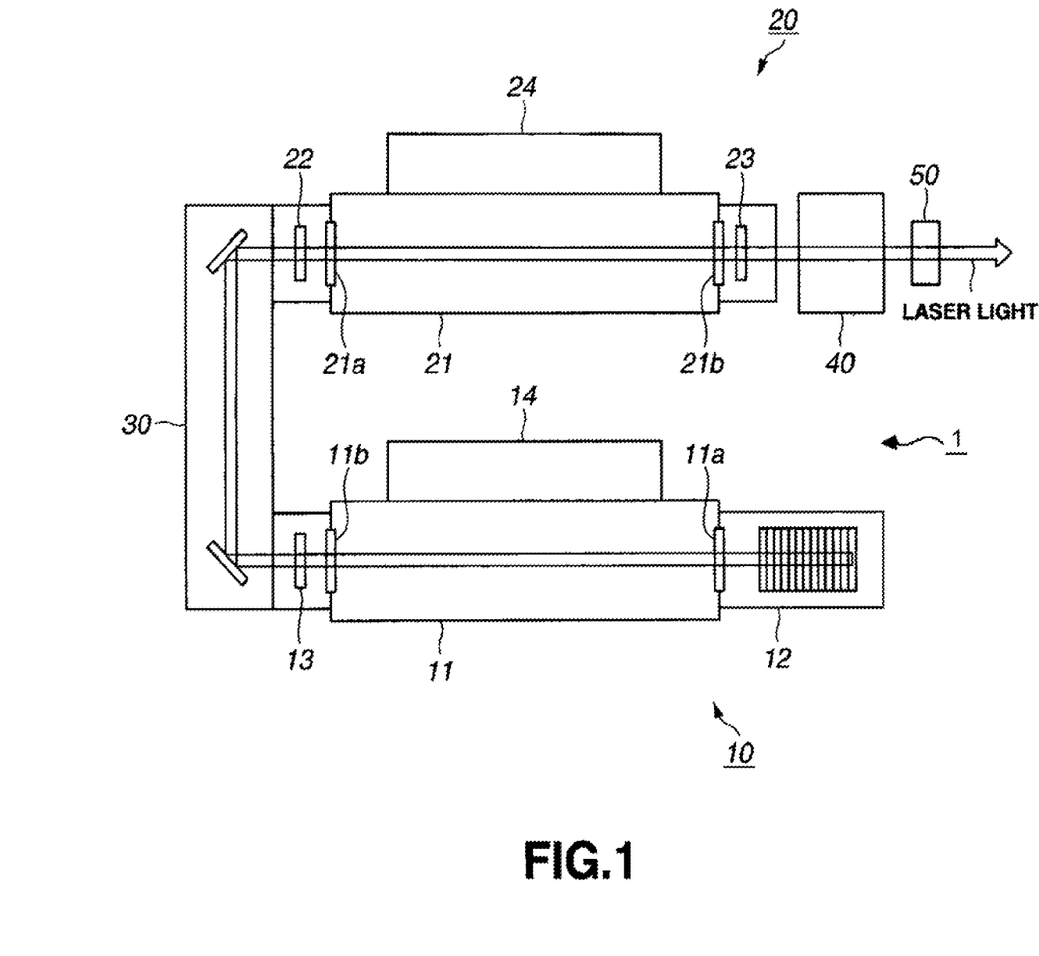
FIG. 1 shows a configuration example of an MOPO-type double chamber laser apparatus.

The lens transmittance is decreased due to increased numerical aperture (NA) according to the immersion exposure technology. Therefore, the output of laser as the light source must be increased in order to achieve fixed exposure. The increase of the laser output is also required to increase the throughput of the exposure device. A double chamber laser apparatus 1 as shown in FIG. 1 is one example of means for obtaining high output with the spectral line width being narrowed. FIG. 1 shows an MOPA laser in which both oscillator and amplifier have a laser resonator.

The double chamber laser apparatus 1 is comprised of an oscillator 10 for outputting narrow-banded laser light, and an amplifier 20 for amplifying the narrow-banded laser beam (referred to as seed light). The double chamber laser apparatus 1 is classified into two types, MOPO type and MOPA type, according to amplification means used in the amplifier 20. The MOPO stands for "master oscillator, power oscillator", and it is also referred to as an injection lock type laser, in which a resonator is provided before and after an amplifier chamber 21 of the amplifier 20. The MOPA stands for "master oscillator, power amplifier" in which no resonator is provided before or after the amplifier chamber of the amplifier 20.

The following description will be made by way of example of an MOPO laser. The oscillator 10 and the amplifier 20 are each provided with an oscillator chamber 11 and an amplifier chamber 21 for containing laser gas. Windows 11a and 11b are attached to the oscillator chamber 11 to allow free passage of light from inside the chamber to the outside and from outside the chamber to the inside. Windows 21a and 21b are attached to the amplifier chamber 21 to allow free passage of light from inside the chamber to the outside and from outside the chamber to the inside. Further, each of the chambers 11 and 21 is provided therein with a pair of main discharge electrodes, a gas circulation fan, a gas cooler and various other devices. These chambers 11 and 21 may have either same configuration or different configurations.

First, in consideration of functional aspects, it is better that the chambers 11 and 21 be designed independently in optimal manner. The oscillator 10 has functions of generation and band narrowing of laser light, while the amplifier 20 has functions of amplification of laser light output from the oscillator 10. Thus, the oscillator 10 and the amplifier 20 have different functions from each other, and hence it is ideal that the chambers thereof are respectively designed to suit their functions. In this case, the chambers 11 and 21 may possibly not be compatible with each other.

On the other hand, when taking the aspects of cost and management into consideration, it is better that the chambers 11 and 21 have the same configuration. By using common parts for both the oscillator chamber 11 and the amplifier chamber 21, the parts management can be simplified, which makes it easy to reduce the cost for deployment of the parts in servicing centers as well as the production cost.

In some cases, the use of common parts in the oscillator chamber 11 and the amplifier chamber 21 does not incur a significant problem in terms of functions. This is because it is possible to give the oscillator chamber 11 and the amplifier chamber 21 appropriate characteristics for their functions by adjusting parameters such as composition of the gas contained in the oscillator chamber 11 and the amplifier chamber 21, reflectance of a front mirror as a part not belonging to the chambers, and rotation speed of a gas circulation fan. Therefore, it is also possible for laser users to use common parts for both the oscillator chamber 11 and the amplifier chamber 21, placing priority to the advantages in cost and management aspects. The following description is based on the configuration wherein the oscillator chamber 11 and the amplifier chamber 21 have the same configuration.

The oscillator chamber 11 and the amplifier chamber 21 (including their windows and parts inside and outside the chambers) are deteriorated along with the increase of the cumulative operation time of the double chamber laser apparatus 1, or the cumulative number of laser shots. Deterioration of the oscillator chamber 11 and the amplifier chamber 21 induces shortening of the life of the laser. When the degree of deterioration of the chambers is increased, the life of the laser per loading of gas will fail to satisfy the specifications. Therefore, once the degree of deterioration has reached a certain level, the oscillator chamber 11 and the amplifier chamber 21 need be replaced. A tolerance is set for the degree of deterioration of the oscillator chamber 11 and amplifier chamber 21, and it is determined that the chamber has reached the end of its service life once the degree of deterioration reaches the limit, namely the allowable deterioration limit.

Figure 3:
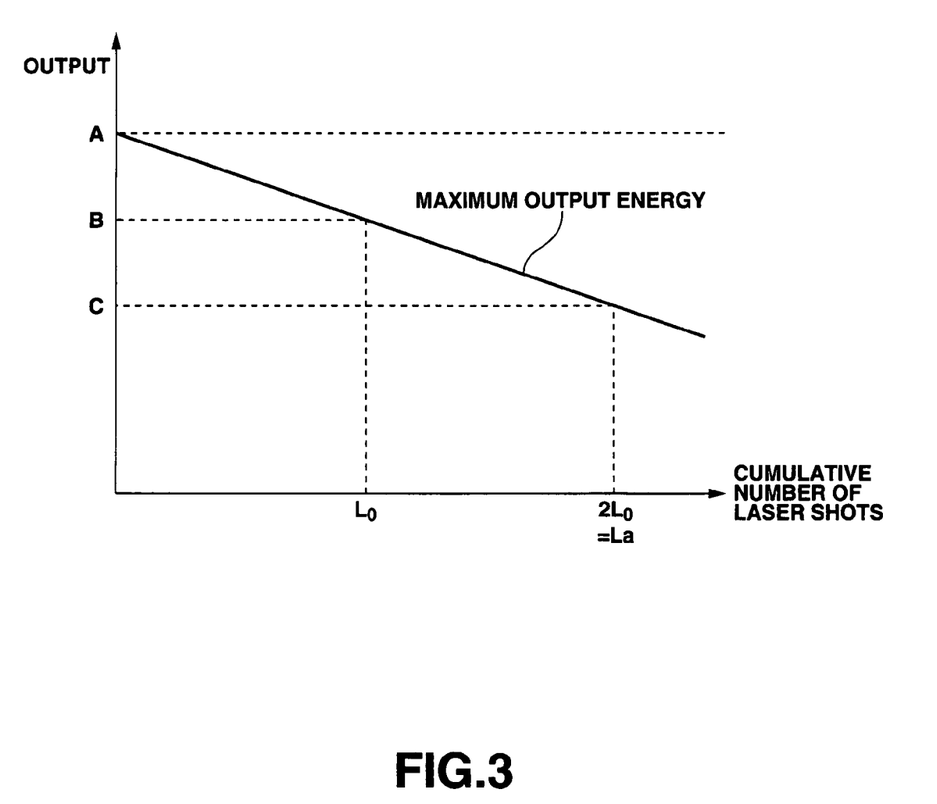
FIG. 3 is a diagram illustrating a concept of service life of oscillator and amplifier chambers.

FIG. 3 illustrates a concept of the service life of chambers in the oscillator and amplifier. FIG. 3 shows relation between the number of laser shots of the double chamber laser apparatus 1 and the maximum output energy of the oscillator chamber 11 and amplifier chamber 21. The vertical axis represents the chamber output energy, and the horizontal axis represents the cumulative number of laser shots. The maximum output energy can be considered as a capability that the chamber holds at the time. It is known that the capability of the chamber is proportional to the degree of deterioration of the chamber. Accordingly, it can be said that the graph in FIG. 3 also illustrates relation between the number of laser shots and the degree of deterioration of the oscillator chamber 11 and amplifier chamber 21.

As shown in FIG. 3, the maximum output energy of the oscillator chamber 11 and amplifier chamber 21 decreases substantially in proportion to the increase of the number of laser shots. This means that the degree of deterioration of the oscillator chamber 11 and amplifier chamber 21 increases substantially in proportion to the increase of the number of laser shots. It is assumed that the degree of deterioration increases along with the increase of the number of laser shots substantially equally between the oscillator 10 and the amplifier 20. Taking an example of a case in which the service life of the chamber of the oscillator 10 is shorter than that of the chamber of the amplifier 20, when the maximum output energy of a new chamber (the number of laser shots of which is zero) is denoted by A, the degree of deterioration of the oscillator chamber 11 reaches the upper limit of the tolerance, or the allowable deterioration limit and the chamber comes to the end of its service life at the time when the maximum output energy of the oscillator 10 has dropped to B, that is to say, the number of laser shots has reached Lo. As for the amplifier 20, the degree of deterioration of the amplifier chamber 21 reaches the allowable deterioration limit and the chamber comes to the end of its service life at the time when the maximum output energy has dropped to C, that is to say, when the number of laser shots has reached La.

Considering that A in FIG. 3 indicates zero degree of deterioration and taking an example of a case in which the service life of the chamber of the amplifier 20 is shorter than that of the chamber of the oscillator 10, the range of allowable deterioration for the chamber of the oscillator 10 corresponds to the range from A to B, while the range of allowable deterioration for the chamber of the amplifier 20 corresponds to the range from A to C. This means that the allowable deterioration limit of the oscillator 10 is lower than that of the amplifier 20.

In FIG. 3, the relation that 2Lo=La is established. The allowable deterioration limit differs between the oscillator 10 and the amplifier 20 because functions are different between the oscillator 10 and the amplifier 20. The oscillator 10 has functions of generating and narrow-banding laser light, while the amplifier 20 has a function of amplifying the laser light emitted by the oscillator 10. Taking these functions into consideration, it can be seen that the oscillator 10 is required to achieve higher quality of laser oscillation. For this reason, more strict management is required for the oscillator 10 than for the amplifier 20. As a result, the range of allowable deterioration is set smaller, that is the tolerance limit for deterioration is set lower for the oscillator 10. It should be noted, however, that the relation that 2Lo=La is just an example, and this relation is not necessarily established in every case. However, the design can be made such that at least the relation that Lo≦La is established. The setting can be made such that La is an integral multiple of (twice or more) Lo, for example, such that the relation that 2Lo=La or 3Lo=La is established.

Conversely, the allowable deterioration limit is sometimes lower for the chamber of the amplifier 20 than for the chamber of the oscillator 10. When the output energy from the amplifier chamber 21 is increased (when the amplification factor is increased), the amplifier 20 reaches the allowable deterioration limit for the amplifier chamber 21 at the time when the maximum output energy has dropped to B. The oscillator 10 reaches the allowable deterioration limit for the oscillator chamber 11 at the time when the maximum output energy has dropped to C. Since the output energy required for the amplifier chamber 21 is high, the range of allowable deterioration is set small, that is, the allowable deterioration limit is set low. In this case as well, the setting can be made such that Lo is an integral multiple of (twice or more) La, for example, such that the relation that 2La=Lo or 3La=Lo is established.

Description will be made of a conventionally practiced chamber replacing method, taking an example of a case in which the allowable deterioration limit is set lower for the chamber of the oscillator 10 than for the chamber of the amplifier 20.

Figure 4:
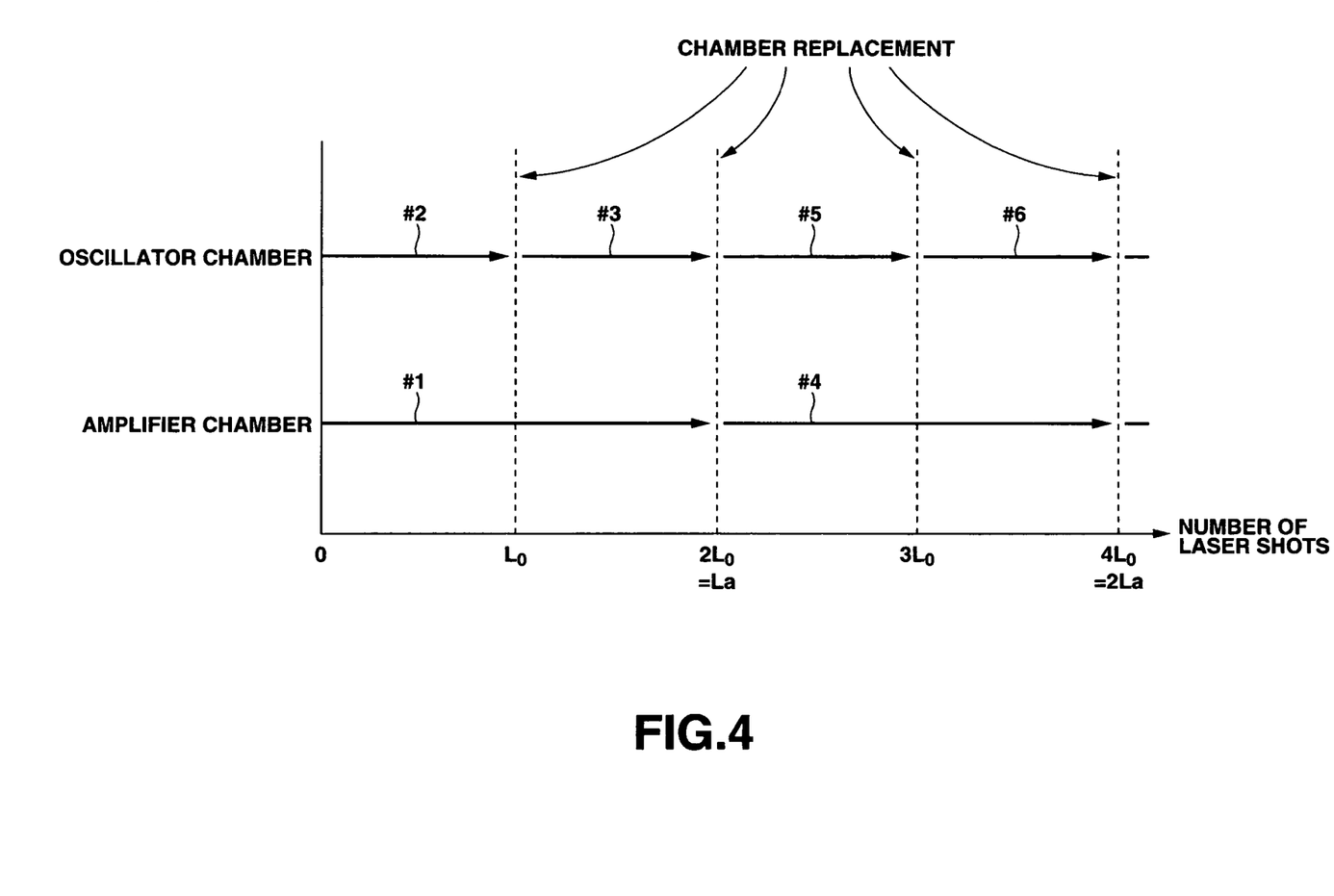
FIG. 4 is a diagram illustrating a mode of chamber replacement cycle according to a conventional method.

FIG. 4 illustrates an example of a chamber replacement cycle according to a conventional method (a case in which 2Lo=La). The figures with the symbol "#" in FIG. 4 represent serial numbers of the chambers 11 and 21 used in the oscillator 10 and amplifier 20. When the number of laser shots reaches Lo, the oscillator chamber 11 ($\#_2$) of the oscillator 10 is replaced with a new oscillator chamber 11 (#3). When the number of laser shots reaches 2Lo (=La), the amplifier chamber 21 (#1) of the amplifier 20 is replaced with a new amplifier chamber 21 (#4), and the oscillator chamber 11 (#3) of the oscillator 10 is replaced with a new oscillator chamber 11 (#5). Likewise, from then on, every time the number of laser shots is increased by Lo, the oscillator chamber 11 of the oscillator 10 is replaced, and every time the number of laser shots is increased by 2Lo (=La), the amplifier chamber 21 of the amplifier 20 is replaced. The term "new chamber" as used herein means not only a brand-new chamber but also a recycled chamber obtained by overhauling (replacing the parts and cleaning the interior of) a used chamber and having equivalent performance to that of a brand-new one.

When the chambers are replaced according to the replacement cycle shown in FIG. 4, it is determined that the oscillator chamber 11 has reached the allowable deterioration limit for the oscillator 10 every time the number of laser shots is increased by Lo, and the oscillator chamber 11 is overhauled or discarded. However, even if the oscillator chamber 11 has reached the allowable deterioration limit for the oscillator 10, it has not reached the allowable deterioration limit for the amplifier 20. This means that the oscillator chamber 11 is still usable when viewing the whole of the double chamber laser apparatus. If the oscillator chamber 11 is nevertheless overhauled or discarded, it is a waste of labor to overhaul the same and waste of replaced parts.

The present invention has been made in view of such problems, and it is an object of the present invention to enable, in a multistage amplification laser apparatus having an oscillator and at least one amplifier, efficient use of chambers of the oscillator to thereby reduce the labor and parts consumed by replacement of the chambers (to reduce the related cost).

SUMMARY OF THE INVENTION

A first aspect of the invention relates to a chamber replacing method for use in a multistage amplification laser apparatus designed such that light generated in an oscillator chamber is amplified in one or more amplifier chambers for generating gain, the oscillator chamber and the amplifier chambers have the same configuration, and the allowable deterioration limit is different between the oscillator chamber and the one or more amplifier chambers. The method includes the steps of: detaching a chamber "a" from one of the chambers of the oscillator and the one or more amplifiers having a low allowable deterioration limit at the timing when a predetermined period elapses; attaching a new chamber in place of the chamber "a"; and detaching a chamber "b" from one of the chambers of the oscillator and the one or more amplifiers other than the one having the low allowable deterioration limit and attaching the chamber "a" in place of the chamber "b".

A second aspect of the invention relates to the first aspect of the invention, in which when the allowable deterioration limit for the chamber "b" can be set to an integral multiple of (twice or more) the allowable deterioration limit for the chamber "a", the chamber "a" is replaced with the chamber "b" at the timing when the deterioration of the chamber "a" reaches the allowable deterioration limit.

A third aspect of the invention relates to the second aspect of the invention, in which the degree of deterioration of each chamber is proportional to a number of laser shots, and the chamber "a" is replaced with the chamber "b" at the timing when the chamber "a" reaches the number of laser shots corresponding to the allowable deterioration limit.

In a multistage amplification laser apparatus having an oscillator and at least one amplifier, the range of allowable deterioration differs among the chambers depending on design thereof. For example, even if the oscillator chamber reaches its allowable deterioration limit as the number of laser shots is increased, it has not reached yet the allowable deterioration limit for the amplifier chamber. In another case, even if the amplifier chamber reaches its allowable deterioration limit as the number of laser shots is increased, it has not reached yet the allowable deterioration limit for the oscillator chamber. In still another case, even if one of two or more amplifier chambers reaches its allowable deterioration limit as the number of laser shots is increased, it has not reached yet the allowable deterioration limit for the other amplifier chambers.

The following description will be made, by way of example, of an MOPO laser, and of a case in which the range of allowable deterioration for the amplifier chamber is greater than that for the oscillator chamber. For example, when it is assumed that the oscillator chamber has a allowable deterioration limit corresponding to the number of laser shots Lo, and the amplifier chamber has a allowable deterioration limit corresponding to the number of laser shots 2Lo (=La), the oscillator chamber has not reached the allowable deterioration limit for the amplifier chamber at the time when it has reached its allowable deterioration limit, and oscillator chamber still has remaining service life corresponding to the number of laser shots Lo.

Further, when it is assumed that the oscillator chamber has a allowable deterioration limit corresponding to a number of laser shots Lo, and the amplifier chamber has a allowable deterioration limit corresponding to a number of laser shots 3Lo (=La), the oscillator chamber has not reached the allowable deterioration limit for the amplifier chamber at the time when it has reached its allowable deterioration limit, and oscillator chamber still has remaining service life corresponding to the number of laser shots 2Lo.

Therefore, when the oscillator and amplifier chambers are to be replaced every time a predetermined period has elapsed, the oscillator chamber is always replaced with a new one while the amplifier chamber is always replaced with the chamber detached form the oscillator. In this manner, the remaining service life that the detached oscillator chamber has is consumed in the amplifier.

Further, when the relation that $nLo=La$ (n is an integer of two or more) is established, the oscillator and amplifier chambers are replaced at the timing when the oscillator chamber reaches its allowable deterioration limit.

Contrary to the description above, in the case in which the oscillator chamber has a greater range of allowable deterioration than the amplifier chamber, the amplifier chamber is always replaced with a new chamber while the oscillator chamber is always replaced with the chamber detached from the amplifier, when the oscillator and amplifier chambers are to be replaced at the timing when a predetermined period has elapsed similarly to the description above. In this manner, the remaining service life that the amplifier chamber has is consumed in the oscillator.

It should be understood that the term "new chamber" as used herein includes not only a brand-new chamber but also a recycled chamber obtained by overhauling a used chamber (by replacing parts and cleaning the interior). The recycled chamber has equivalent performance to that of the brand-new chamber.

According to the present invention, a chamber which has been used in the oscillator but has not reached its allowable deterioration limit is reused so that the remaining service life of the chamber is consumed in the amplifier. Alternatively, a chamber which has been used in the amplifier but has not reached its allowable deterioration limit is reused so that the remaining service life of the chamber is consumed in the oscillator. Alternatively, a chamber which has been used in an amplifier but has not reached its allowable deterioration limit is reused so that the remaining service life thereof is consumed in another amplifier. In this manner, unlike the prior arts, the opportunity to overhaul or discard chambers which have not reached the limit of deterioration and are still usable is minimized, enabling reduction of the labor and parts consumed for the replacement.

DETAILED DESCRIPTION OF THE INVENTION

Embodiments of the present invention will be described with reference to the accompanying drawings.

FIG. 1 shows a configuration example of an MOPO-type double chamber laser apparatus.

A double chamber laser apparatus 1 has an oscillator 10 for generating and narrow-banding light, an amplifier 20 for amplifying the light output from the oscillator 10, a beam steering module 30 for guiding the laser light output from the oscillator 10 to the amplifier 20, a monitor module 40 for detecting the laser light output from the amplifier 20, and a shutter 50 for switching between a state in which the laser light is output to the outside of the laser apparatus and a state in which the laser light is shut off.

The oscillator 10 has an oscillator chamber 11 for containing laser gas. The oscillator chamber 11 has windows 11a and 11b attached thereto to allow free passage of light from inside the chamber to the outside and from outside the chamber to the inside. The oscillator chamber 11 is provided therein with a pair of main discharge electrodes facing each other, a gas circulation fan, a gas cooler, and various other devices.

A narrowbanding module 12 is provided on a laser light path on the rear side of the oscillator chamber 11, and an oscillator front mirror 13 is provided on a laser light path on the front side of the oscillator chamber 11. The narrowbanding module 12 is provided with optical elements such as a prism beam expander and a grating. The narrowbanding module 12 and the oscillator front mirror 13 together make up an optical resonator.

An oscillator pulse power module 14 has a switching element and a magnetic compression circuit, and supplies charging energy to the main discharge electrodes within the oscillator chamber 11 through the magnetic compression circuit, in response to a trigger signal output by a controller (not shown) to the switching element.

The amplifier 20 has an amplifier chamber 21 containing laser gas. The amplifier chamber 21 has windows 21a and 21b attached thereto to allow free passage of light from inside the chamber to the outside and from outside the chamber to the inside. The amplifier chamber 21 is provided therein with a pair of main discharge electrodes facing each other, a gas circulation fan, a gas cooler, and various other devices.

An amplifier rear mirror 22 is provided on a laser light path on the rear side of the amplifier chamber 21, and an amplifier front mirror 23 is provided on a laser light path on the front side of the amplifier chamber 21.

An amplifier pulse power module 24 has a switching element and a magnetic compression circuit, and supplies charging energy to the main discharge electrodes within the amplifier chamber 21 through the magnetic compression circuit, in response to a trigger signal output by a controller (not shown) to the switching element.

The oscillator chamber 11 provided in the oscillator 10 has same configuration as that of the amplifier chamber 21 provided in the amplifier 20.

A beam steering module 30 has one or more mirrors in its casing, and these mirrors guide the laser light output from the oscillator 10 to the amplifier 20.

The monitor module 40 has a beam splitter and an optical sensor. Laser light entering the monitor module 40 is split by the beam splitter. One of the split beams is emitted out of the monitor module 40, while the other enters the optical sensor. Output energy and spectral bandwidth are determined on the basis of an output from the optical sensor.

The switching of the shutter 50 is controlled by a controller (not shown). For example, the shutter 50 is opened during exposure of a semiconductor, and closed during oscillation adjustment.

A chamber replacing method according to an embodiment of the invention will be described, taking as an example of a case in which the allowable deterioration limit is set lower for the chamber of the oscillator 10 than for the chamber of the amplifier 20.

Figure 2:
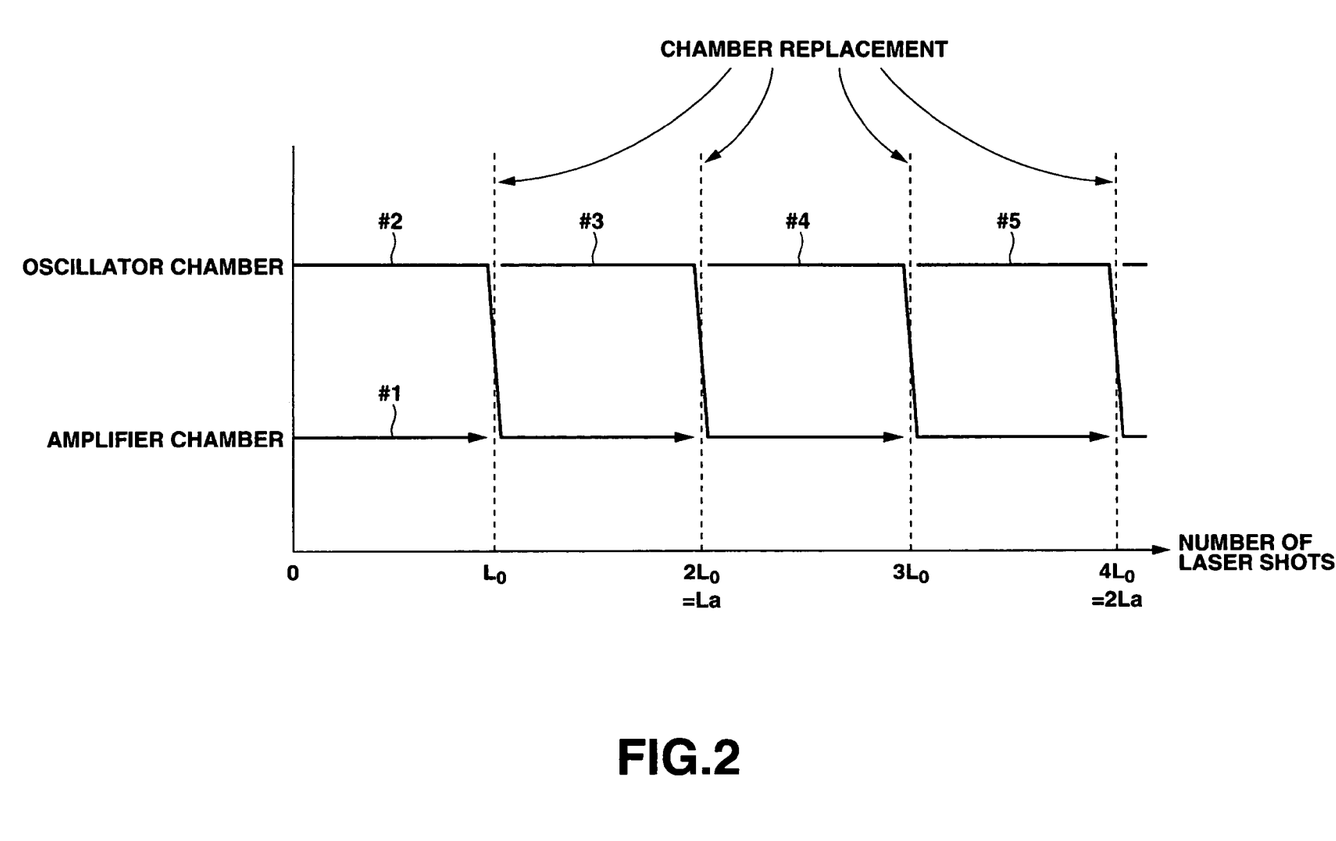
FIG. 2 is a diagram illustrating a mode of chamber replacement cycle according to a method of an embodiment of the present invention.

FIG. 2 illustrates a mode of chamber replacement cycles according to the method of the embodiment (the case in which 2Lo=La). Like in FIG. 4, the figures with the symbol "#" in FIG. 2 represent serial numbers of the chambers 11 and 21 used in the oscillator 10 and amplifier 20. The method of the embodiment is different from the conventional method in that the oscillator chamber 11 which has reached the allowable deterioration limit for the oscillator 10 is reused as an amplifier chamber 21. Procedures to replace the chambers according to the embodiment of the invention will be described.

First, prior to starting laser oscillation, that is to say, at the time when the number of laser shots is zero, an amplifier chamber 21 (#1) is attached to the amplifier 20 and an oscillator chamber 11 (#2) is attached to the oscillator 10.

When the laser oscillation is started and the number of laser shots reaches Lo, the deterioration of the oscillator chamber 11 (#2) reaches the allowable deterioration limit for the oscillator chamber 11. The oscillator chamber 11 (#2) is then detached from the oscillator 10, and a new oscillator chamber 11 (#3) is attached in place of the oscillator chamber 11 (#2). Although the deterioration of the oscillator chamber 11 (#2) detached from the oscillator 10 has reached the allowable deterioration limit for the oscillator chamber 11, it has not reached yet the allowable deterioration limit for the amplifier chamber 21, and has remaining service life corresponding to the number of laser shots Lo. Thus, the amplifier chamber 21 (#1) is detached from the amplifier 20 and the oscillator chamber 11 (#2) detached from the oscillator 10 is attached in place thereof, so that this oscillator chamber 11 (#2) is reused as an amplifier chamber 21 (#2).

On the other hand, the deterioration of the amplifier chamber 21 (#1) detached from the amplifier 20 also still has remaining service life corresponding to the number of laser shots Lo before reaching the allowable deterioration limit for the amplifier chamber 21. Therefore, this amplifier chamber 21 (#1) may be reused in another laser apparatus 1 or may be overhauled.

When laser oscillation is further carried out after the replacement of the chambers and the number of laser shots reaches 2Lo (=La), the deterioration of the oscillator chamber 11 (#3) reaches the allowable deterioration limit for the oscillator chamber 11. Thus, the oscillator chamber 11 (#3) is detached from the oscillator 10, and a new oscillator chamber 11 (#4) is attached in place thereof. Although the deterioration of the oscillator chamber 11 (#3) has reached the allowable deterioration limit for the oscillator chamber 11, it has not reached yet the allowable deterioration limit for the amplifier chamber 21 and still has remaining service life corresponding to the number of laser shots Lo. Therefore, the amplifier chamber 21 (#2) is detached from the amplifier 20, and the oscillator chamber 11 (#3) detached from the oscillator 10 is attached in place thereof, so that this oscillator chamber 11 (#3) is reused as an amplifier chamber 21 (#3).

On the other hand, the amplifier chamber 21 (#2) detached from the amplifier 20 has consumed its life time corresponding to the number of laser shots Lo in the oscillator 10 and has additionally consumed its life time corresponding to the number of laser shots Lo in the amplifier 20, that is to say, it has consumed its life time corresponding to the number of laser shots 2Lo (=La) in total. This means that the deterioration of this amplifier chamber 21 (#2) has reached the allowable deterioration limit for the amplifier chamber 21 and hence the amplifier chamber 21 (#2) is overhauled or discarded.

In this manner, every time the number of laser shots is increased by Lo, the chambers 11 and 21 are detached from the oscillator 10 and the amplifier 20, and a new oscillator chamber 11 (#x) is attached to the oscillator 10 and the oscillator chamber 11 (#x−1) detached from the oscillator 10 is attached to the amplifier 20. This means that, a chamber is used through a cycle in the sequence of the oscillator 10, the amplifier 20, and overhaul.

It should be understood that although FIG. 2 shows the case in which 2Lo=La, a case in which 3Lo=La is also possible.

In the case in which 3Lo=La, the replacement may be performed, for example, by a method in which, every time the number of laser shots is increased by Lo, the chambers 11 and 21 are detached from the oscillator 10 and the amplifier 20, respectively, and a new oscillator chamber 11 (#x) is attached to the oscillator 10 while the oscillator chamber 11 (#x−1)

detached from the oscillator 10 is attached to the amplifier 20. In this case, the deterioration of the amplifier chamber 21 detached from the amplifier 20 has not reached yet the allowable deterioration limit for the amplifier chamber 21 and still has remaining service life corresponding to the number of laser shots Lo. Accordingly, this chamber 21 may be used in another laser apparatus 1 or may be overhauled.

Another example of the chamber replacing method in the case in which 3Lo=La may be such that every time the number of laser shots is increased by Lo, the oscillator chamber 11 is detached from the oscillator 10 and a new oscillator chamber 11 is attached thereto, while every time the number of laser shots is increased by 2Lo (by 3Lo only for the first time), the amplifier chamber 21 is detached from the amplifier 20 and the oscillator chamber 11 detached from the oscillator 10 is attached thereto.

The description so far has been made of the cases in which 2Lo=La and 3Lo=La. As seen from the description above, a relation that nLo=La (n is an integer of two or more) can generally be established between the number of laser shots Lo and the number of laser shots La. Although there are some cases in which this relation that nLo=La is not established, the design can be made such that at least a relation that Lo≦La is established. The present invention is applicable so far as this relation that Lo≦La is established.

Although, according to the present embodiment, the chamber replacement is performed at the timing when the oscillator chamber 11 and the amplifier chamber 21 reach their allowable deterioration limits, the chamber replacement may be performed at any time before the oscillator chamber 11 and the amplifier chamber 21 reach their allowable deterioration limits. In this case, it is preferable in view of the ease of the chamber replacement work to preset a certain number of laser shots so that the chamber replacement is performed every time the number of laser shots is increased by that preset number.

Although the description of the embodiment above has been made of the case of replacing the chambers of the oscillator and amplifier of the double chamber laser apparatus, the present invention is also applicable to a multi-chamber laser apparatus having an oscillator and a plurality of amplifiers. When applied to a multi-chamber laser apparatus, the chamber detached from the oscillator may be attached to one of the plurality of amplifiers, or a chamber detached from one of the amplifiers may be attached to another amplifier. Further, the present invention is also applicable to a laser apparatus having a ring-type amplifier.

According to the present embodiment, if a chamber detached from the oscillator has not reached its limit of deterioration, the chamber is reused in the amplifier to consume its remaining service life. Therefore, unlike the prior arts, the opportunity to overhaul or discard chambers which have not reached the limit deterioration and are still usable is minimized, enabling reduction of the labor and parts consumed for the replacement.

When the oscillator chamber has a greater range of allowable deterioration than the amplifier chamber, the chamber replacement is performed in the same procedures as the description above but with the oscillator chamber and the amplifier chamber being interchanged in FIG. 2.

The description has been made by way of example of the MOPO laser. However, the present invention is also applicable to an MOPA laser and the chamber replacement can be performed in the same manner.

What is claimed is:

1. A chamber replacing method for use in a multistage amplification laser apparatus designed such that light generated in an oscillator chamber is amplified in one or more amplifier chambers for generating gain, the oscillator chamber and the amplifier chambers having same configuration, an allowable deterioration limit being different between the oscillator chamber and the one or more amplifier chambers, the method comprising:
  detaching a chamber "a" from among the oscillator and the one or more amplifiers having a low allowable deterioration limit at a timing when a predetermined period elapses;
  attaching a new chamber in place of the chamber "a"; and
  detaching a chamber "b" from among the oscillator and the one or more amplifiers other than the one having the low allowable deterioration limit and attaching the chamber "a" in place of the chamber "b".

2. The chamber replacing method according to claim 1, wherein the allowable deterioration limit for the chamber "b" is set to more than the allowable deterioration limit for the chamber "a", and the chamber "a" is attached in place of the chamber "b" at a timing when the deterioration of the chamber "a" reaches the allowable deterioration limit for the chamber "a".

3. The chamber replacing method according to claim 2, wherein a degree of deterioration of each chamber is proportional to a number of laser shots, and the chamber "b" is replaced with the chamber "a" at a timing when the deterioration of the chamber "a" reaches the number of laser shots corresponding to the allowable deterioration limit for the chamber "a".

4. The chamber replacing method according to claim 1, wherein the multistage amplification laser apparatus is a master oscillator power amplifier (MOPA) type, or an MOPA type having one or more power amplifiers added thereto.

5. The chamber replacing method according to claim 1, wherein the multistage amplification laser apparatus is of an injection lock type or of a ring-type.

6. The chamber replacing method according to claim 1, wherein the allowable deterioration limit for the chamber "b" is set to at least twice the allowable deterioration limit for the chamber "a", and the chamber "a" is attached in place of the chamber "b" at a timing when the deterioration of the chamber "a" reaches the allowable deterioration limit for the chamber "a".

7. The chamber replacing method according to claim 6, wherein a degree of deterioration of each chamber is proportional to a number of laser shots, and the chamber "b" is replaced with the chamber "a" at a timing when the deterioration of the chamber "a" reaches the number of laser shots corresponding to the allowable deterioration limit for the chamber "a".

8. A chamber replacing method for use in a multistage amplification laser apparatus designed such that light generated in an oscillator chamber is amplified in one or more amplifier chambers for generating gain, an allowable deterioration limit being different between the oscillator chamber and the one or more amplifier chambers, the method comprising:
  detaching a chamber "a" from among the oscillator and the one or more amplifiers having a low allowable deterioration limit at a timing when a predetermined period elapses;
  attaching a new chamber in place of the chamber "a"; and
  detaching a chamber "b" from among the oscillator and the one or more amplifiers other than the one having the low allowable deterioration limit and attaching the chamber "a" in place of the chamber "b".

9. The chamber replacing method according to claim 8, wherein the allowable deterioration limit for the chamber "b" is set to more than the allowable deterioration limit for the chamber "a", and the chamber "a" is attached in place of the chamber "b" at a timing when the deterioration of the chamber "a" reaches the allowable deterioration limit for the chamber "a".

10. The chamber replacing method according to claim 9, wherein a degree of deterioration of each chamber is proportional to a number of laser shots, and the chamber "b" is replaced with the chamber "a" at a timing when the deterioration of the chamber "a" reaches the number of laser shots corresponding to the allowable deterioration limit for the chamber "a".

11. The chamber replacing method according to claim 8, wherein the multistage amplification laser apparatus is a master oscillator power amplifier (MOPA) type, or an MOPA type having one or more power amplifiers added thereto.

12. The chamber replacing method according to claim 8, wherein the multistage amplification laser apparatus is of an injection lock type or of a ring-type.

13. The chamber replacing method according to claim 8, wherein the allowable deterioration limit for the chamber "b" is set to at least twice the allowable deterioration limit for the chamber "a", and the chamber "a" is attached in place of the chamber "b" at a timing when the deterioration of the chamber "a" reaches the allowable deterioration limit for the chamber "a".

14. The chamber replacing method according to claim 13, wherein a degree of deterioration of each chamber is proportional to a number of laser shots, and the chamber "b" is replaced with the chamber "a" at a timing when the deterioration of the chamber "a" reaches the number of laser shots corresponding to the allowable deterioration limit for the chamber "a".

* * * * *